United States Patent
Rose et al.

(10) Patent No.: US 11,709,048 B2
(45) Date of Patent: Jul. 25, 2023

(54) TREAD LINE SCANNER

(71) Applicant: WHEELRIGHT LIMITED, Begbroke (GB)

(72) Inventors: Peter Norman Rose, Begbroke (GB); Michael Taylor, Begbroke (GB)

(73) Assignee: WHEELRIGHT LIMITED, Begbroke (GB)

( * ) Notice: Subject to any disclaimer, the term of this patent is extended or adjusted under 35 U.S.C. 154(b) by 226 days.

(21) Appl. No.: 16/485,648

(22) PCT Filed: Feb. 13, 2017

(86) PCT No.: PCT/EP2017/053176
§ 371 (c)(1),
(2) Date: Aug. 13, 2019

(87) PCT Pub. No.: WO2018/145776
PCT Pub. Date: Aug. 16, 2018

(65) Prior Publication Data
US 2020/0018591 A1    Jan. 16, 2020

(51) Int. Cl.
*G01B 11/22* (2006.01)
*B60C 11/24* (2006.01)
*G01M 17/02* (2006.01)

(52) U.S. Cl.
CPC ............ *G01B 11/22* (2013.01); *B60C 11/243* (2013.01); *G01M 17/027* (2013.01)

(58) Field of Classification Search
None
See application file for complete search history.

(56) References Cited

U.S. PATENT DOCUMENTS

| | | | |
|---|---|---|---|
| 4,095,464 A | 6/1978 | Breedijk | |
| 5,506,683 A * | 4/1996 | Yang | G01B 11/2504 356/606 |
| 5,895,845 A | 4/1999 | Burger | |
| 5,987,978 A * | 11/1999 | Whitehead | G01B 11/22 73/146 |

(Continued)

FOREIGN PATENT DOCUMENTS

| CN | 102388290 A | 3/2012 |
|---|---|---|
| DE | 1809459 A1 | 6/1970 |

(Continued)

OTHER PUBLICATIONS

Office Action for Japanese Application No. 2019-543206 dated Dec. 8, 2020, 12 pages.

(Continued)

*Primary Examiner* — Jill E Culler

(57) ABSTRACT

A device for measuring tread depth of tyres, wherein in use a tyre can be driven over the device in a first direction, the device comprising: a light source arranged to illuminate the tyre; an obstruction extending in a second direction substantially perpendicular to the first direction and arranged to partially block the light emitted from the light source such that a shadow is cast on the tyre when the tyre is located above the device, and such that the shadow is cast on the tyre in a direction substantially perpendicular to the tread of the tyre; and a camera arranged to view an illuminated section of the tyre.

19 Claims, 4 Drawing Sheets

(56) References Cited

U.S. PATENT DOCUMENTS

| | | | |
|---|---|---|---|
| 9,459,092 B2 * | 10/2016 | Luther | G01M 17/027 |
| 9,983,098 B2 * | 5/2018 | Santanera | G01M 17/027 |
| 2010/0059663 A1 | 3/2010 | Desieres | |
| 2012/0067115 A1 | 3/2012 | Pingel | |
| 2014/0232852 A1 | 8/2014 | Nobis et al. | |
| 2015/0330773 A1 | 11/2015 | Uffenkamp et al. | |
| 2016/0258842 A1 | 9/2016 | Taylor et al. | |

FOREIGN PATENT DOCUMENTS

| | | | | |
|---|---|---|---|---|
| DE | 102012224260 A1 | 6/2014 | | |
| DE | 202014007337 U1 | 12/2015 | | |
| JP | H3-63506 A | 3/1991 | | |
| JP | H9-508977 A | 9/1997 | | |
| JP | H10-096611 A | 4/1998 | | |
| JP | 2006-017574 A | 1/2006 | | |
| JP | 2007-232543 A | 9/2007 | | |
| JP | 2009-534700 A | 9/2009 | | |
| JP | 2013-205407 A | 10/2013 | | |
| JP | 2015-148583 A | 8/2015 | | |
| JP | 2017-500540 A | 1/2017 | | |
| WO | 1996037754 A1 | 11/1996 | | |
| WO | WO-2017060739 A1 * | 4/2017 | | B60C 11/246 |

OTHER PUBLICATIONS

First Office Action for Chinese Application No. 201780088763.8, dated Dec. 3, 2020, 8 pages.

International Preliminary Report on Patentability for Application No. PCT/EP2017/053176, dated Aug. 22, 2019, 7 pages.

PCT International Search Report and the Written Opinion dated Sep. 13, 2017, issued in related International Application No. PCT/EP2017/053176 (11 pages).

Examination Report for India Application No. 201917036402, dated Apr. 29, 2021, 6 pages.

* cited by examiner

TREAD LINE SCANNER

CROSS REFERENCE TO RELATED APPLICATIONS

This application is a national stage application under 35 U.S.C. § of PCT Application No. PCT/EP2017/053176, filed Feb. 13, 2017, the content of which is incorporated herein by reference in its entirety.

The invention relates to the measurement of tread depth of pneumatic tyres of vehicles.

Some existing optically based scanners of tread depth are provided above the road surface and adjacent to the tyres of a vehicle when the vehicle drives past the scanner. Although these scanners work well for most vehicles, the scanners do not always work well for vehicles with multiple tyres arranged in close proximity to one another such that one of the tyres blocks the view to another one of the tyres. An example of such vehicle is a 3 axle HGV (heavy goods vehicle) trailer.

According to a first aspect of the invention, there is provided a device for measuring tread depth of tyres, wherein in use a tyre can be driven over the device in a first direction. The device comprises a light source arranged to illuminate the tyre, an obstruction extending in a second direction substantially perpendicular to the first direction and arranged to partially block the light emitted from the light source such that a shadow is cast on the tyre when the tyre is located above the device, and such that the shadow is cast on the tyre in a direction substantially perpendicular to the tread of the tyre, and the device further comprises a camera arranged to view an illuminated section of the tyre.

The light source may be linear and parallel to the obstruction. For example, the light source can be a strip of LED lights. The obstruction may also be substantially linear.

The device may further comprise reflective optical elements arranged to direct light reflected from the tyre onto the camera. The reflective optical elements may include a mirror having a parabolic shape in the direction parallel to the obstruction. The reflective optical elements may comprise one or more flat mirrors to direct the reflected light towards the camera.

The obstruction is formed by a part of the housing of the device, or the obstruction may be provided by a strip of material which blocks light, wherein said strip of material is provided on a transparent material.

According to a second aspect of the invention, there is provided a method of measuring tread depth of tyres, the method comprising: driving a tyre over a scanner in a first direction; illuminating the tyre with a light source provided by the scanner; blocking the light emitted by the light source in a second direction substantially perpendicular to the first direction such that a shadow is cast on the tyre in a direction substantially perpendicular to the tread of the tyre; and viewing the illuminated section of the tyre with a camera.

The method may further comprise illuminating a linear section of the tyre using a light source which is linear and perpendicular to the first direction. The light source may be a strip of LED lights. The method may further comprise blocking the light with a linear obstruction. The illuminated region of the tyre can be illuminated onto the camera using reflective optical elements. A parabolic mirror may be used to enable the camera to view into the tread of the tyre. The optical path of the reflected light may be folded one or more times using flat mirrors or lenses.

Some embodiments of the invention will now be described by way of example only and with reference to the accompanying drawings, in which.

Figure 1:
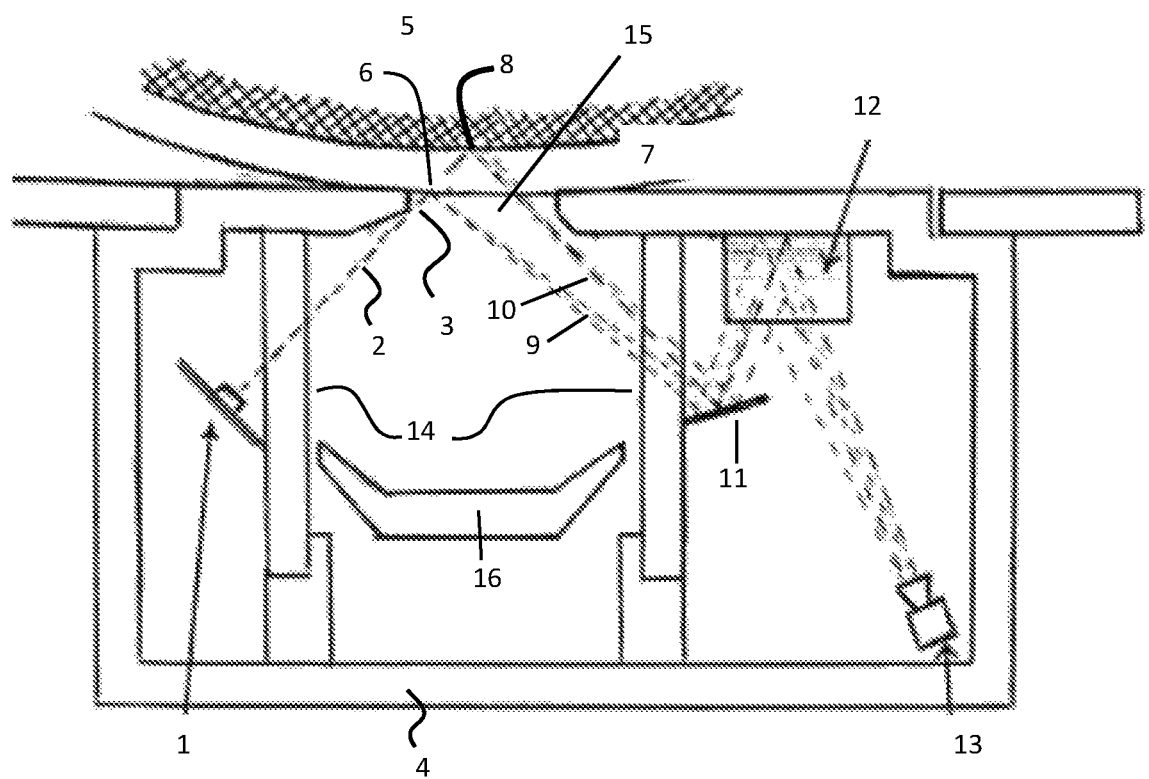
FIG. 1 is a vertical cross section through a tyre tread scanner.

The inventors have realised that some of the problems of existing tyre tread scanners can be solved by using a scanner which is provided beneath the tyres when the vehicle drives over the scanner or is placed over the scanner. A scanner is provided with a light source which illuminates a section of the tyre when the tyre is located above the scanner. An obstruction is provided such that the obstructions block part of the light from the light source. The obstruction extends generally perpendicular to the direction in which the tyre is driven over the scanner, which is generally the same as the direction of the tread. The obstruction will therefore cast a shadow onto the tyre perpendicular to the direction of the treads. A camera is provided to view the illuminated section of the tyre.

The image recorded by the camera will include the illuminated section of the tyre and the shadow which is cast onto the tyre. The obstruction has a generally straight edge such that a sharp shadow is cast onto the tyre. When reflected light is detected at an angle which is not the same as the angle of incidence of the light, but for example in the region between 60 and 120 degrees with respect to the incident light, then the shadow will show a stepped pattern in which the depth of the step is directly related to the depth of the tread. More precisely, an angle between incident light and reflected light of around 90 degrees will show the optimal differential in step between the shadow line on the perimeter of the tyre and the shadow line on the inside if the tread of the tyre. However, the angle can vary because an incoherent and wide angled light source can be used, such as a strip of LED lights.

In a specific embodiment, the strip of LED lights and the obstruction to the emitted light are both linear and generally perpendicular to the direction of the tread when the tyre is placed above the scanner. The tread will not necessarily be placed exactly straight on the scanner, so the orientation of the shadow with respect to the direction of the tread will vary, but the best contrast can be obtained by providing a shadow which is generally parallel to the axle of the tyre.

The light reflected from the tyre is viewed with a camera. In one embodiment, the camera is placed directly adjacent to the tyre, but in other embodiments reflective optics are used to manipulate the path of the reflected light. Flat mirrors can be used to fold the path one or more times such that the camera can be placed in a convenient place of the housing of the scanner and such that a compact housing can be used. Reflective optics can also be used to make the path of the light longer such that a larger section of the tyre can be viewed with the camera.

The depth of the tread will depend on the vehicle and tyre, but the depth can be 0-25 mm for a bus or HGV, and can be 0-8 mm for a car or van. The camera will view the best contrast between the shadow on the perimeter of the tyre and the shadow within the tread if the camera is placed in the same direction as the tread such that the camera can view into the tread. The inventors have realised that the number of treads which can optimally be viewed by a camera can be increased by using a mirror with a parabolic surface in the direction perpendicular to the tyre and with the camera placed in the focal point of the parabola. The rays of light which are parallel to the axis of the parabola will all be imaged onto the camera, and if the axis of the parabola is also parallel to the direction of the treads then the camera will be able to view into each of the treads of the tyre.

FIG. 1 illustrates an embodiment of a scanner. A light source 1 is provided which emits light over a broad range of directions. The light is generally centred around light ray 2 illustrated in FIG. 1. Part of the light is blocked by sharp edge 3 of housing 4. The light which is not blocked falls onto a tyre 5 placed on top of the scanner. Part of the light will be reflected at point 6 at the perimeter of the tyre. Adjacent to point 6 in the direction perpendicular the cross section, a tread 7 is provided and a further portion of the light will be reflected at point 8 which is the deepest point in the tread. Reflected rays 9 and 10 are further reflected by a flat mirror 11 and a parabolic mirror 12 before detection by camera 13. The parabolic mirror is placed above the flat mirror and above the camera. Alternative arrangements can be used, for example with the camera and light source both provided on the same side of the housing and reflective optics on the other side of the housing.

Transparent windows 14 are provided to protect the optical elements. The glass can be treated with a hydrophobic coating. An air knife or similar nozzle with dry air supply can also be used to ensure the view remains clear. An open window 15 is provided in the housing, but this window can also be closed by transparent material. A tray 16 is provided to catch dirt which falls through open window 15.

Figure 2:
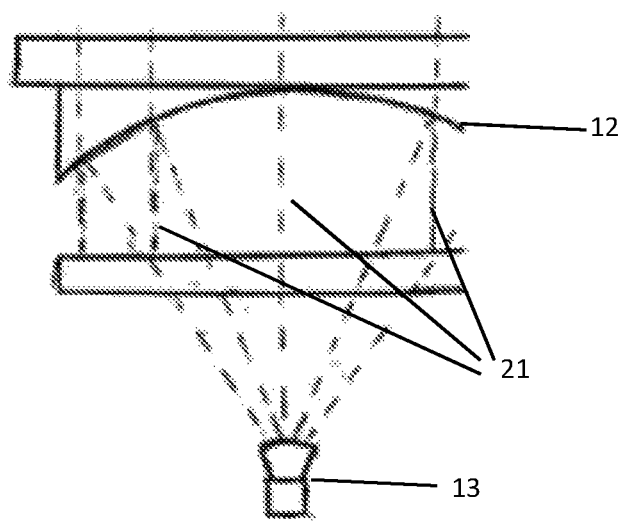
FIG. 2 is a top view onto a parabolic mirror and camera of the scanner.

FIG. 2 is a top view of a detail of the scanner of FIG. 1, seen in the direction parallel to the cross section of FIG. 1 and parallel to the direction of the treads of the tyre. Parabolic mirror 12 and camera 13 are shown. The light rays 21 which are reflected from the tyre perimeter and tyre tread are parallel and are all reflected towards camera 13 which is placed in the focal point of the parabolic mirror. Given that the parallel light rays are imaged onto the camera, the camera can view into multiple parallel treads which may be too deep to view at an angle which is not parallel to the illustrated rays.

Figure 3:
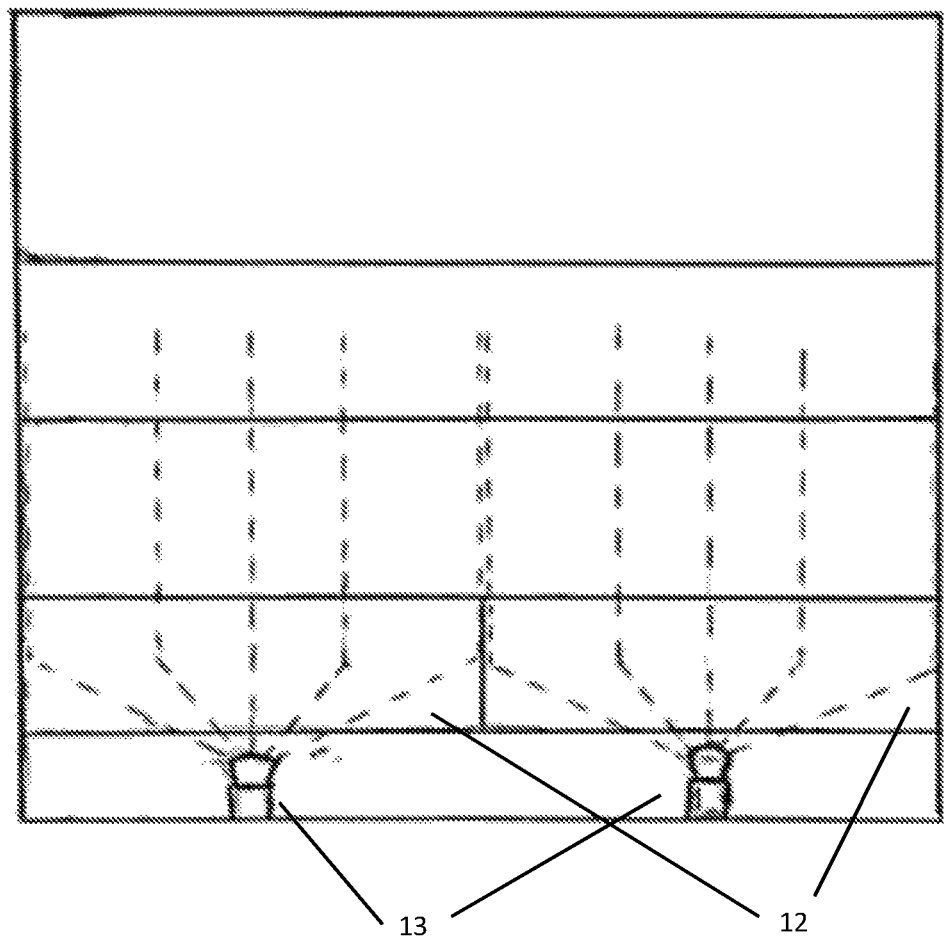
FIG. 3 is a side view onto parabolic mirrors and cameras of the scanner.

FIG. 3 is a side view of a detail of the scanner of FIG. 1, also seen in the direction parallel to the cross section of FIG. 1 and parallel to the direction of the treads of the tyre. Two cameras 13 are shown which detect light reflected at two corresponding parabolic mirrors 12.

The camera will detect a pattern of the shadow line with is stepped, showing multiple treads in the tyre. Pattern recognition software is used to process the image and to determine the tread depth. Calibration measurements will be used for calibrating the software and for improving the measurement. The determined tread depth can be transmitted to the driver of the vehicle or to the operator of the fleet of vehicles such that appropriate action can be taken if the tread is below the legal limit or otherwise not acceptable.

The device may be deactivated in between measurements when no vehicle is provided above the device. The device is then activated and the lighting and camera switched on when a sensor detects the presence of a vehicle. The sensor may be an optical sensor, a pressure sensor or any other appropriate sensor known in the art.

Depths up to 25 mm can be measured over a width of 1 m. The device can take axle loads of up to 10 t per axle. The device is suitable for outdoor use. However, the invention is not limited to these ranges.

Uneven wear of tyres around the circumference of the tyre may occur. In order to detect uneven wear, multiple devices can be installed in succession to measure multiple points around the circumference of a tyre.

Figure 4:
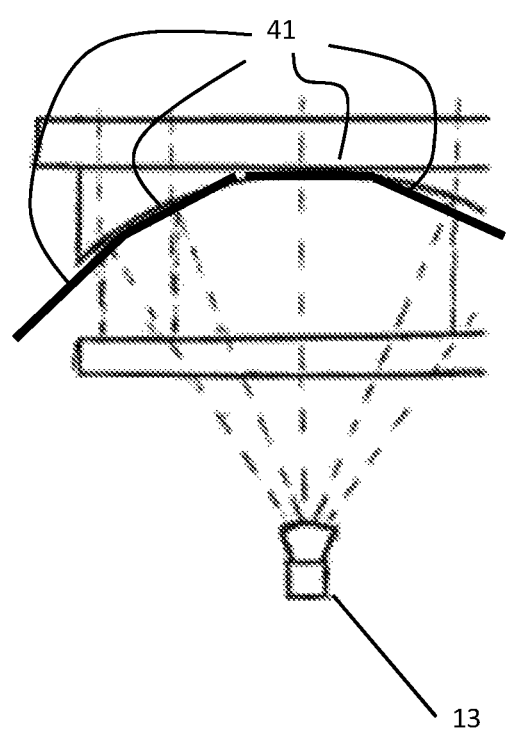
FIG. 4 is a top view onto a set of flat mirrors which approximate a parabolic mirror and a camera.

As an alternative embodiment, a set of flat mirrors is used which together approximate the shape of the parabolic mirror. FIG. 4 shows camera 13 which detects light reflected from a set of flat mirrors 41. Four flat mirrors 41 are illustrated in FIG. 4, but any appropriate different number of mirrors can be used. The parabolic mirror of the first embodiment is used in order to be able to see the deepest point of the tread and avoid only being able to see the side wall of the tread which is not directly in the line of view of the camera when no parabolic mirror is used. This purpose can also be achieved by a set of flat mirrors and practical considerations will determine the number of flat mirrors.

Instead of an optical imaging system which is based on mirrors, a solid transparent material such as glass or Perspex can be used which images the light using total internal reflection. The interfaces between the material and air at the outside surfaces act as mirrors and can optionally be provided with a reflective coating to further improve reflection. The LEDs can be formed integrally with the material to avoid air gaps. An advantage of this embodiment is compact design and a rigid structure which can withstand large forces of vehicles driving over it.

The embodiment illustrated in FIG. 1 shows an edge 3 of the housing for creating a shadow. Other arrangements can be used to create a shadow. For example, a strip can be provided on window 14 which blocks the light, or a window in gap 15 can include a strip or a line which blocks the light and creates a sharp shadow line onto the tyre.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A device for measuring tread depth of tyres, wherein in use a tyre is driven over the device in a first direction, the device comprising:
   a light source arranged to illuminate the tyre;
   an obstruction at a surface of a housing of the device, the obstruction extending in a second direction substantially perpendicular to the first direction and arranged to partially block the light emitted from the light source such that a shadow is cast on the tyre when the tyre is located above the device, and such that the shadow is cast on the tyre in a direction substantially perpendicular to a tread of the tyre;
   a camera arranged to view an illuminated section of the tyre; and
   reflective optical elements disposed between the tyre and the camera and arranged to direct light reflected from the tyre onto the camera, wherein the reflective optical elements include a mirror having a parabolic shape in a direction parallel to the obstruction to direct the light reflected from the tyre onto the camera, wherein the camera is placed at a focal point of the mirror having the parabolic shape, and an axis of the parabolic shape is in parallel to a direction of the tread,
wherein the light source is linear and parallel to the obstruction.

2. The device according to claim 1, wherein the light source is a strip of LED lights.

3. The device according to claim 1, wherein the obstruction is substantially linear.

4. The device according to claim 1, wherein the obstruction is formed by a part of the housing of the device.

5. The device according to claim 1, wherein the obstruction is provided by a strip of material which blocks light, and wherein said strip of material is provided on a transparent material.

6. The device according to claim 1, wherein the reflective optical elements include a flat mirror disposed between the tyre and the mirror having a parabolic shape, wherein the mirror having the parabolic shape is disposed above the flat mirror.

7. The device according to claim 6, wherein the flat mirror is disposed above the camera.

8. The device according to claim 1, wherein the housing comprises an open window to allow the light emitted from the light source to illuminate the tyre, and comprises at least one transparent window configured to separate the reflective optical elements and the camera from the open window.

9. The device according to claim 8, wherein the housing further comprises a tray having a concave shape facing and under the open window.

10. A method of measuring tread depth of tyres with a device, the method comprising:
driving a tyre over a scanner in a first direction;
illuminating the tyre with light emitted by a light source provided by the scanner;
partially blocking, with an obstruction, the light emitted by the light source in a second direction substantially perpendicular to the first direction such that a shadow is cast on the tyre in a direction substantially perpendicular to the tread of the tyre, wherein the obstruction is at a surface of a housing of the device; and
viewing the illuminated section of the tyre with a camera; and
imaging the illuminated section of the tyre onto the camera using one or more reflective optical elements disposed between the tyre and the camera and arranged to direct light reflected from the tyre onto the camera, wherein the one or more reflective optical elements include a mirror having a parabolic shape in a direction parallel to the second direction to direct light reflected from the tyre onto the camera and enabling the camera to view into the tread of the tyre, wherein the camera is placed at a focal point of the mirror having the parabolic shape, and an axis of the parabolic shape is in parallel to a direction of the tread,
wherein the light source is linear and parallel to the obstruction.

11. The method of claim 10, further comprising illuminating a linear section of the tyre using a light source which is linear and perpendicular to the first direction.

12. The method of claim 10, wherein the light source is a strip of LED lights.

13. The method of claim 10, further comprising blocking the light with a linear obstruction.

14. A device for measuring tread depth of tyres, wherein in use a tyre is driven over the device in a first direction, the device comprising:

a light source arranged to emit light to illuminate the tyre;
an obstruction at a surface of a housing of the device, the obstruction extending in a second direction substantially perpendicular to the first direction and arranged to partially block the light emitted from the light source such that a shadow is cast on the tyre when the tyre is located above the device, and such that the shadow is cast on the tyre in a direction substantially perpendicular to a tread of the tyre;
a camera arranged to view an illuminated section of the tyre; and
reflective optical elements disposed between the tyre and the camera and arranged to direct light reflected from the tyre onto the camera, wherein the reflective optical elements include a plurality of flat mirrors arranged in a parabolic shape in the direction parallel to the obstruction to direct the light reflected from the tyre onto the camera, wherein the camera is placed at a focal point of the plurality of flat mirrors arranged in the parabolic shape, and an axis of the parabolic shape is in parallel to a direction of the tread,
wherein the light source is linear and parallel to the obstruction.

15. The device according to claim 14, wherein the reflective optical elements further include a first flat mirror disposed between the tyre and the plurality of flat mirrors arranged in the parabolic shape, wherein the plurality of flat mirrors arranged in the parabolic shape is disposed above the first flat mirror.

16. The device according to claim 15, wherein the first flat mirror is disposed above the camera.

17. The device according to claim 14, wherein the housing comprises an open window to allow the light emitted from the light source to illuminate the tyre, and comprises at least one transparent window configured to separate the reflective optical elements and the camera from the open window.

18. The device according to claim 17, wherein the housing further comprises a tray having a concave shape facing and under the open window.

19. A device for measuring tread depth of tyres, wherein in use a tyre is driven over the device in a first direction, the device comprising:
a light source arranged to illuminate the tyre;
an obstruction at a surface of a housing of the device, the obstruction extending in a second direction substantially perpendicular to the first direction and arranged to partially block the light emitted from the light source such that a shadow is cast on the tyre when the tyre is located above the device, and such that the shadow is cast on the tyre in a direction substantially perpendicular to a tread of the tyre;
a camera arranged to view an illuminated section of the tyre; and
a solid transparent material disposed between the tyre and the camera and arranged to direct light reflected from the tyre onto the camera using total internal reflection, wherein the solid transparent material comprises an outer surface having a parabolic shape in a direction parallel to the obstruction to direct the light reflected from the tyre onto the camera, wherein the camera is placed at a focal point of the outer surface having the parabolic shape, and an axis of the parabolic shape is in parallel to a direction of the tread, wherein the light source is linear and parallel to the obstruction.

\* \* \* \* \*